US011379994B2

(12) United States Patent
Lauritsch et al.

(10) Patent No.: US 11,379,994 B2
(45) Date of Patent: Jul. 5, 2022

(54) METHOD AND IMAGING DEVICE FOR GENERATING A MOTION-COMPENSATED IMAGE, COMPUTER PROGRAM, AND STORAGE MEDIUM

(71) Applicant: Siemens Healthcare GmbH, Erlangen (DE)

(72) Inventors: Günter Lauritsch, Nuremberg (DE); Christopher Rohkohl, Brixen Im Thale (AT)

(73) Assignee: Siemens Healthcare GmbH, Erlangen (DE)

( * ) Notice: Subject to any disclaimer, the term of this patent is extended or adjusted under 35 U.S.C. 154(b) by 257 days.

(21) Appl. No.: 16/745,596

(22) Filed: Jan. 17, 2020

(65) Prior Publication Data

US 2020/0242783 A1 Jul. 30, 2020

(30) Foreign Application Priority Data

Jan. 29, 2019 (DE) .......................... 102019201079.2

(51) Int. Cl.
*G06T 7/246* (2017.01)
*G06T 7/277* (2017.01)

(52) U.S. Cl.
CPC .............. *G06T 7/246* (2017.01); *G06T 7/277* (2017.01); *G06T 2207/20201* (2013.01); *G06T 2207/30048* (2013.01); *G06T 2207/30101* (2013.01)

(58) Field of Classification Search
CPC combination set(s) only.
See application file for complete search history.

(56) References Cited

U.S. PATENT DOCUMENTS

2006/0224062 A1\* 10/2006 Aggarwal .......... G01R 33/5673
600/413
2007/0053482 A1\* 3/2007 Kohler ...................... G06T 7/20
378/8

(Continued)

FOREIGN PATENT DOCUMENTS

DE 102010022791 A1 12/2011
EP 2242023 A1 10/2010

OTHER PUBLICATIONS

Gutleben, Klaus-Jürgen, et al. "Three-dimensional coronary sinus reconstruction-guided left ventricular lead implantation based on intraprocedural rotational angiography: a novel imaging modality in cardiac resynchronization device implantation." Europace 13.5 (2011): 675-682.

(Continued)

*Primary Examiner* — Zhiyu Lu
(74) *Attorney, Agent, or Firm* — Lempia Summerfield Katz LLC

(57) ABSTRACT

The disclosure relates to a method and an imaging device for generating a motion-compensated image of a target object. The disclosure further relates to a corresponding computer program and a computer-readable storage medium. In the method, a reference image is generated from projection images of a target object. Furthermore, a motion field which characterizes a motion of the target object shown is determined iteratively. In each case, after a predetermined number of iterative acts, the existing reference image is replaced by a provisional motion-compensated image, which is then used for the further iteration. The initial reference image is generated without using a synchronization or gating-signal that characterizes a motion of the target object.

13 Claims, 2 Drawing Sheets

(56) References Cited

U.S. PATENT DOCUMENTS

| | | | |
|---|---|---|---|
| 2011/0044524 A1* | 2/2011 | Wang | G01R 33/563 382/131 |
| 2011/0298793 A1 | 12/2011 | Lauritsch | |
| 2013/0197347 A1* | 8/2013 | Moghari | G01R 33/56509 600/410 |
| 2014/0334705 A1* | 11/2014 | Ishii | G06T 7/277 382/131 |

OTHER PUBLICATIONS

Kingma, Diederik P. et al. "Adam: A Method for Stochastic Optimization" 3rd International Conference for Learning Representations (ICLR), San Diego, 2015. pp. 1-15.

Rohkohl, Christopher, et al. "ECG-gated interventional cardiac reconstruction for non-periodic motion." International Conference on Medical Image Computing and Computer-Assisted Intervention. Springer, Berlin, Heidelberg, 2010. pp. 151-158.

Rohkohl, Christopher, et al. Interventional 4D motion estimation and reconstruction of cardiac vasculature without motion periodicity assumption. Medical Image Analysis 2010; 14: 687-94.

Schultz, Carl J., et al. "Rotational angiography with motion compensation: first-in-man use for the 3D evaluation of transcatheter valve prostheses." EuroIntervention: journal of EuroPCR in collaboration with the Working Group on Interventional Cardiology of the European Society of Cardiology 11.4 (2015): 442-449.

Strumia, Maddalena "Radiopaque catheter for motion and deformation estimation" Prior Art Journal 2019 #12—ISBN: 978-3-947591-15-2; 2019. pp. 124-126.

German Office Action for German Application No. 10 2019 201 079.2 dated Jan. 27, 2020.

Ruder, Sebastian: "An overview of gradient descent optimization algorithms"; arXiv preprint arXiv:1609.04747v2; 2017; pp. 1-14.

Schwemmer, Chris, et al. "Residual motion compensation in ECG-gated interventional cardiac vasculature reconstruction." Physics in Medicine & Biology 58.11 (2013): 3717-3737.

Çimen, Serkan, et al. "Reconstruction of coronary arteries from X-ray angiography: A review." Medical image analysis 32 (2016): 46-68.

* cited by examiner

METHOD AND IMAGING DEVICE FOR GENERATING A MOTION-COMPENSATED IMAGE, COMPUTER PROGRAM, AND STORAGE MEDIUM

The present patent document claims the benefit of German Patent Application No. 10 2019 201 079.2, filed Jan. 29, 2019, which is hereby incorporated by reference.

TECHNICAL FIELD

The disclosure relates to a method and an imaging device for generating a motion-compensated image of a target object, for example, of a patient or of a part of a patient. The disclosure further relates to a corresponding computer program and a computer-readable storage medium including such a computer program.

BACKGROUND

The device-assisted imaging and the data processing of image data or measured data for generating digital images of target or examination objects is now an important component of medical technology and medical practice. For example, tomographic volume images of a vascular tree may be acquired and reconstructed for the planning, navigation, or monitoring of endovascular therapies with known angiographic C-arm systems. Methods used for this purpose may assume, however, that an examination object that is to be acquired or imaged is motionless. Yet this may not be a realistic or achievable assumption.

In live patients, at least cardiac vessels, for example, move and other vessels or organs move, for example, when the respective patient breathes. Even when imaging cerebral vessels, head movements cannot be ruled out. Movements of the patient or of parts of the patient during image acquisition or imaging may lead to motion artifacts or to blurred imaging of anatomical structures in a reconstructed image, as a result of which the ability to detect the respective anatomical situation and make a corresponding diagnosis is made more difficult and, in an extreme scenario, anatomical structures are completely unrecognizable and therefore the reconstructed image may ultimately become unusable.

Against this background, various measures and possible solutions have already been developed. In the case of periodic motion, it is possible to use, for example, a reference, synchronization, or gating signal that describes this motion, such that individual projection images, from which a volume image is ultimately reconstructed, are acquired in each case at the same point or in the same phase of a corresponding motion cycle. This is possible, for example, when imaging cardiac vessels and is referred to here for instance as ECG gating. Irregular movements, such as, for example, an arrhythmic heartbeat or also superimpositions of a plurality of movements or types of movement, however, may continue to be problematic. Moreover, this methodology is limited to cardiac issues or applications. Indeed, it may be theoretically possible to transfer the synchronization or gating principle to other applications, for example, based on a specific respiratory phase in the breathing cycle, but due to the longer timescale of the respiratory cycle compared with the heartbeat, it may be impractical and/or involve a longer acquisition time and hence a significantly increased risk to the patient's health. Moreover, here too, a regular and uniform breathing and hence motion may not be realistic or achievable in practice.

A further approach to obtaining useable images despite a motion of the examination object during the image acquisition is described in "Interventional 4-D Motion Estimation and Reconstruction of Cardiac Vasculature without Motion Periodicity Assumption" by C. Rohkohl, G. Lauritsch, et al. in Med. Image Anal. 2010 October; 14(5):687-94. doi: 10.1016/j.media.2010.05.003. In this paper, motion estimation for high-contrast objects is to be carried out and described using the example of selectively contrasted cardiac vessels.

SUMMARY AND DESCRIPTION

The object of the present disclosure is to enable, in a way that is particularly simple to use, high quality imaging of a patient that is suitable for diagnostic purposes even when the patient is moving, without additional exposure of the patient.

The scope of the present disclosure is defined solely by the appended claims and is not affected to any degree by the statements within this summary. The present embodiments may obviate one or more of the drawbacks or limitations in the related art.

A method according to the disclosure is used to generate a motion-compensated image of a target object or of an examination object, for example, of a patient, of a part of a patient, of an organ, or of a tissue sample or suchlike. The present disclosure may likewise find application, however, for non-medical purposes, too, for example in the industrial environment. The present disclosure may also be (e.g., fully or partially) computer implemented. As part of the method, a plurality of projection images of the target object are acquired, that is, for instance, of a predetermined acquisition or imaging region or volume, the projection images having been or being acquired during a motion of at least part of the target object, wherein the motion has a main point. In particular, the plurality of projection images are acquired from different angles, angulations, or viewing directions with respect to the target object, such that a three-dimensional reconstruction or view, that is, a 3D- or volume image of the target object, may be generated from the projection images. In particular, the target object is shown in all the projection images.

The acquisition of the projection images may refer to or include the recording of the projection images or of relevant raw or measured data or sensor data, that is, actual mapping or surveying of the target object. Likewise, the acquisition of the projection images, may mean or include retrieval of the projection images or of the raw, measured, or sensor data from a data memory that is provided, for example, by a data-processing apparatus or imaging device.

The motion of the target object is intended here to have a motion main point or resting point, and therefore is to be seen, for example, as the opposite of continuous translation. Examples of such a main point may be, for instance, a diastolic resting phase or a pause for breath between the end of an exhalation and the start of a subsequent inhalation, if the motion is a cardiac motion or a heartbeat or a respiratory motion or a motion in the abdominal region caused by the breathing or the respiratory motion. The motion including the main point may be a periodic or quasi-periodic motion in which the part of the target object that is moving accordingly leaves a starting point at least once, (e.g., repeatedly), and returns to this starting point again. Here, a quasi-periodicity means that the motion may be uneven or irregular, and may have, for example, varying period lengths, amplitudes and/or pathways or trajectories traversed during one period in each case. This may be the case in a breath or respiratory motion of a real patient, because the breathing curve is indeed run through repeatedly but is not or does not have to be strictly periodic in the mathematical sense. The same applies to other motions or types of motion, such as, for instance, the cardiac motion or secondary motions caused by breathing or by the heartbeat. The fact that the motion is intended to have such a main point does not represent any noteworthy restriction because organic motions have such a main point in a time window of a plurality of seconds, such as is now required, for example, to acquire a rotational scan of the target object.

In a further process act of the present method, a reference image of the target object is generated from the projection images that have been acquired, in particular, from some or all of the projection images, with this ensuing without using a synchronization signal that characterizes the motion of the target object. In other words, therefore, no synchronization signal, (e.g., no gating or selection signal), is used or processed to select projection images to be used for the reference image. Examples of such a synchronization signal may be an ECG signal or a breathing curve, for instance. Provision is therefore made such that the reference image is generated, in particular automatically, from the projection images without what is known as gating.

This non-use of a synchronization or gating signal is initially counter-intuitive, that is not obvious, because the reference image generated in this way may be of significantly poorer quality than a reference image generated from a selection of projection images in a known manner by gating using a synchronization signal. From the reference image that has been generated in the present case without using the synchronization signal, that is, without gating, it may therefore possibly not be easy to calculate the motion of the target object for a motion compensation with an accuracy that is adequate for practical purposes. Therefore, such a procedure has not been used or considered in the known existing prior art and medical practice. However, the present disclosure is based on the insight that the reference image generated in this way, despite its comparatively inferior quality, is a good point of departure for generating a motion-compensated image of adequate or even good quality.

For this purpose, in a further process act of the method, a motion field that characterizes the motion of the target object is determined iteratively from the projection images, which field encompasses motion vectors for the individual projection images with respect to the respective current reference image. This may be formulated as an optimization problem, in which, for instance, one or a plurality of parameters for a predetermined motion model for the target object is adjusted or varied in an iterative manner. Provision is made that, after a given number of iteration acts in each case, with motion compensation based on the respective current motion field, a provisional motion-compensated image of the target object is generated. This may be a 3D-reconstruction, e.g., a generation or reconstruction of a volume image of the target object.

In motion-compensated image generation or image reconstruction, individual images, image components, or image elements may be moved relative to other images, image components, or image elements used for the generation or reconstruction, that is, adjusted in their three-dimensional coordinates and in fact, exactly as specified by the motion field in an image-precise or image element-precise manner. If the target object includes for instance a vascular tree, then this may move in its entirety or in parts between respective imaging times for the plurality of projection images. Without motion compensation, a superimposition or combination of the projection images would then ultimately lead to an image in which at least some image contents—in this case, for example, individual blood vessels or vascular sections of the vascular tree—are shown as elongated or blurred, in particular fuzzy, compared to the representation thereof in one individual projection image in each case, and compared to the real form thereof. Due to the motion field, corresponding images or image components that contribute to such elongated or blurred image contents are therefore moved three-dimensionally that is with respect to their spatial coordinates, before or during image generation or image reconstruction in order to reduce the elongation or the blurring, that is, to compensate for this. This method may basically be used for virtually any random image contents, for example likewise for bone tissue, organ boundaries and/or suchlike that are imaged.

The generation of the provisional motion-compensated image may likewise potentially include a manual, partly automatic, or fully automatic segmentation of the provisional motion-compensated image, a (e.g. intensity-based) thresholding, that is, threshold value filtering, and/or further image processing acts.

Provision may be made for a corresponding iterative image to be generated in the context of the iteration to determine the motion field in each iterative act, in order to carry out an evaluation of, for example, a predetermined target function for the iteration and/or an adjustment or variation of at least one parameter for the respective next iterative act. The respective previous reference image is then replaced by the provisional motion-compensated image as a new current reference image. The iterative determination of the motion field is then continued using the new current reference image. For example, in the subsequent iterative acts, the respective iterative image that has been generated may then be compared with this new current reference image, for instance, with respect to a similarity, a number and/or an intensity of motion artifacts, a contrast, an image definition and/or suchlike.

It is therefore a key feature of the present disclosure that the reference image used for the iterative determination of the motion field is regularly renewed during the iteration process, in particular is replaced by a provisional motion-compensated image that is the best available at each point in time.

As a further part or process act of the present method, when a predetermined termination condition for the iteration is reached or met, the—definitive or final—motion-compensated image is generated from the projection images and from the last iteration of the motion field, or the provisional motion-compensated image generated last during the iteration is processed into the motion-compensated image of the target object or issued as the—definitive or final—motion-compensated image of the target object.

The predetermined termination condition may include a predetermined number of iterative acts, the elapsing of a predetermined computation time since the beginning of the iteration, a fulfilment of a convergence criterion for the target function of the iteration or optimization, attainment of a predetermined image characteristic, e.g., of a minimum image definition, size, length, width, or suchlike from reconstructed details, for instance an anatomical structure, such as a blood vessel or vascular tree, or suchlike.

The projection images used as input data may be FDK-filtered images for use for the known Feldkamp back projection algorithm. The projection images may likewise be subtraction images, for example, when used for digital subtraction angiography (DSA).

The acts in the method, and advantageous variants thereof, may be carried out in particular using a processing facility, (e.g., a microprocessor, microchip or microcontroller, an interface, and/or a memory unit in the data processing facility). The memory unit may be or include a volatile working memory, that is, not permanently storing data, such as a Random-Access Memory (RAM), a non-volatile mass memory, that is, permanently storing data, such as a hard disk, a USB stick, an SD card, or a Solid-State Disk (SSD) or suchlike.

Corresponding projection matrices for back projection and/or data or characteristics relating to the volume shown and/or to a projection or projection geometry used therein, (e.g., a size, a resolution, a projection origin, or suchlike), may be additionally provided as further input data to a data processing facility or imaging device by which the method is carried out.

To determine the motion field, a multi-dimensional motion model or a model, in particular, a three-dimensional model of the volume shown or of the target object may be specified with motion vectors for the individual projection images. These motion vectors may then form the parameters to be adjusted, varied, or optimized. For determining the motion field, or for the relevant modelling, a linear interpolation may be used in the spatial domain, for example. The target function for the iteration may be formulated to find parameters of the motion model that result in an image that has been reconstructed having reduced motion artifacts accordingly compared with the respective reference image. The basic concept here may therefore be formulated as reconstructing a template of the moving target object and maximizing a similarity between this template and a motion-compensated reconstruction. A problem with this is that no "correct" template is available. As a solution therefore, the respective best available reference image is used as the template, which image is then improved or refined in each case within the context of the method.

In the present case, therefore, a dynamic reconstruction algorithm may be used, it being possible for determining the motion field for an initial set of parameters to first be specified, and then be varied or optimized in the context of the iteration. In order to determine whether an improvement is achieved with the respective current motion field, that is, whether a possibly provisional, motion-compensated image of the target object with reduced motion artifacts may be reconstructed on the basis of the current motion field, in particular automatically, an evaluation of the respective current motion field, of the respective current set of parameters and/or of the respective iterative image may be carried out, that is, for example, of the provisional motion-compensated image, using a predetermined evaluation parameter or a predetermined target function that includes such an evaluation parameter. Because the actual motion of the target object is initially unknown during the recording of the projection images, this motion or the corresponding motion field may be estimated at least initially and therefore a predetermined estimation function may be used.

The present disclosure has yielded very good results in a series of sample data sets. In certain examples, 3D-motion fields may not change abruptly in a location, and the motion field may therefore be mathematically smooth. If the initial reference image shows part of the moving structure, the motion of this part may be estimated in the iterative method. Parts of the target object in the vicinity of the visible structure, (e.g., of the visible part of the target object), may move in a similar manner to one another, such that, in the motion-compensated reconstruction, that is, for instance in the respective provisional motion-compensated images, they are at least visible. With each update, that is with each replacement, of the reference image, the visible structure may then be extended part by part until the entire target object has been captured by the motion compensation.

The present disclosure is therefore suited in particular to thinly or sparsely populated target objects or corresponding projection images with a relatively high contrast, because even when the target object is moving, a tomographic reconstruction is possible in a particularly reliable manner.

Advantageously, the motion compensation may be applied retrospectively. If, for example, an image acquisition is unsuccessful due to an unpredicted movement of the target object, then a corresponding volume image that is initially unusable due to motion artifacts may be restored or corrected by motion compensation using the present method to the extent that it may be used for diagnostic or other medical purposes. Here, a respective user therefore does not need to repeat the initially unsuccessful image acquisition. This advantageously saves working time and is advantageous for the target object, that is, for example, for a respective patient, because a repeat administration of contrast agent and further exposure to X-rays may be avoided, for example. Using the calculating hardware that is available nowadays, the reconstruction may be carried out so quickly, (e.g., in less than one minute per image), that a workflow in the treatment room is not too severely disrupted. By the present method, the generation of the motion-compensated image may advantageously be carried out at least more quickly than a repeat image acquisition.

Due to the fact that no synchronization signal is required, the workflow and the amount of hardware required may advantageously be reduced. Because no electrodes have to be used to capture the ECG signal, for example, nor any respiratory belt or chest straps to record the breathing curve, not only may the examination or treatment of the respective patient be carried out more quickly, but a negative impact on the respective staff members, for example due to the corresponding cables used, is avoided, making it possible in turn to reduce the risk of an accident during the examination or treatment.

The ECG gating described in the beginning may not be used to correct or avoid motion artifacts in images taken in the abdominal region, where motion artifacts are mainly caused by respiratory movements. Any clinical use of tomographic volume images in the abdominal region in particular may have been seriously impaired, therefore, by corresponding image interference. An alternative solution approach may involve the use of shorter or faster rotations of the C-arm system, that is, shorter or faster image acquisition times. Unlike the present disclosure, however, this may lead to a reduced contrast resolution, which may likewise have a negative effect on the clinical usefulness. Conversely, the present disclosure makes it possible, irrespective of the duration of the scan, to generate or obtain volume images of a reliably high-value or high-quality level even in the event of an unpredicted or irregular motion of the respective target object. This may ultimately contribute to an improved diagnostic or treatment success and hence to the patient's well-being.

Although the present disclosure is not dependent on the use of a synchronization or gating signal, it may be combined with one. In a particularly advantageous manner, the gating may be performed dynamically to generate or update the reference images during the iteration process. Thus, for example, in the course of the iteration, the gating may be relaxed in comparison with the initial gating, such that more and more projection images are gradually added or considered in each calculation. Towards the end of the iterative method, all the projection data may then be used such that no more gating occurs. Then at least during a partial section of the method or the determination of the motion field, neither a synchronization signal nor gating is therefore used.

In an advantageous embodiment, a sparsification method is used for generating the reference image, as a result of which a thinly or sparsely populated image that contains only the highest image element values that have been selected out of all the image element values available for the respective reference image using a predetermined threshold value is generated as a reference image. In other words, only those of the available image element values that fall above the given threshold value are therefore used for the respective reference image when the threshold value is specified as an intensity value, for example. The threshold value may likewise be specified as a percentage, percentage figure, or percentile. Then, for a given threshold value of X %, for example, the upper or highest X % of the image element values sorted by size or intensity may be used. The sparsification, that is, the selection of the image element values to be used according to the threshold value, or a corresponding discarding of the remaining image element values may be applied, for example, to the individual projection images. Likewise, a provisional volume image may be reconstructed initially from the projection images and the sparsification may be applied to this provisional volume image to generate the reference image. Image element values of image elements that are not used may be replaced for example by 0. Through the sparsification, the necessary computation work may advantageously be reduced by taking into consideration, to determine the motion field, for example, only image element values that differ from 0 or image element values. By restricting the image element values that are used or that contribute, according to the predetermined threshold value, it is, moreover, already possible for the process of locating the target object in the reference image to be improved. The predetermined threshold value may be between 0.1% and 0.25%, such that only the image elements with the top 0.1% to 0.25% of values, for example, are then used or considered. The image element values may be Hounsfield values, for example. The image elements may be pixels in the projection images or voxels of a volume image generated, that is reconstructed, therefrom. In total, due to the sparsification provided here, the generation of the motion-compensated image may be performed in a particularly reliable and particularly fast and efficient manner.

In a further advantageous embodiment, the iterative determination of the motion field is implemented as an optimization problem with a given cost function, which defines, as a metric for the optimization problem, a correlation between the respective reference image and an image of the target object that has been generated in a motion-compensated manner using the respective current motion field. For the optimization problem, an integral may then be maximized or minimized via the cost function depending on the formula. The cost function may contain terms which describe the respective current reference image and an iterative image generated in the respective iterative act, for example, the provisional motion-compensated image. These terms may have as dependencies, for example, a location, (e.g., a spatial variable), and also a respective motion vector $s_i$ for the projection image. By setting or adjusting the cost function, the method may advantageously be configured to respective application- or situation-specific requirements or needs in a particularly simple manner.

In an advantageous development, a term in the cost function that describes a respective motion-compensated iterative image of the target object has an exponent that is greater than 1. Here in particular, the cost function may be defined in the image space, it being possible for the iterative image described by the term supplied with the exponent accordingly to be a back projection of one of the projection images. By the exponent, which may be equal to 3, for example, the correlation between the respective reference image and the respective iterative image, that is, the respective provisional motion-compensated image, may be influenced. Basically, other exponents, such as 1, for example, may likewise be used. By higher or greater exponents, however, advantageously greater image element values, that is, for example, voxels of relatively higher intensity, may be given higher priority or emphasis, such that ultimately an image intensity in positions in which even the reference image has an image element value that differs from 0, that is for example, an intensity that differs from 0, may be emphasized or maximized. This may advantageously reduce a duration of the iterative method.

In a further advantageous embodiment, to solve the optimization problem, the Adam optimization algorithm may be used for the stochastic optimization. Adam is an algorithm for optimizing stochastic target functions based on gradients of the first order and an adaptive estimation of moments of a lower order. Adam or a corresponding optimization method that implements Adam is advantageously relatively simple to use and efficient to calculate and has relatively low memory requirements. The Adam algorithm has been known until now from Deep-Learning applications, where it has shown that it may handle even large-scale problems. It is an insight achieved by the present disclosure that, precisely because of the complexity of the determination of the motion field or of the corresponding optimization, the Adam algorithm may be particularly usefully applied. A corresponding method may calculate adaptive learning rates for various parameters of estimates of first and second moments of gradients. Further details regarding the Adam algorithm are described, for example, in the publication "Adam: A Method for Stochastic Optimization" by D. P. Kingma and J. Ba, published as a conference paper at the 3rd International Conference for Learning Representations, San Diego, 2015, arXiv:1412.6980.

In a further advantageous embodiment, in each iterative act in the determination of the motion field, only one subset of all the image elements or image element values available for this purpose is considered. For example, a maximum of 20% or a maximum of 10% of the image elements or image element values, that is, for instance of voxels from back projections of the projection images, may be used. The subset to be used may be determined either explicitly or using a set number or set percentage. In particular, the respective subset or selection of image elements may therefore be used as a basis for calculating the aforementioned cost function or for calculating a gradient. As a result, as opposed to using all the available image elements, something that is likewise possible, the mathematical complexity of the method may advantageously be reduced and consequently computation time or computation effort may be saved. Hence the method may advantageously also be used in some cases on existing or on lower-power hardware. In an alternative or extended implementation, the determination of the motion field and/or of the cost function may be possible directly from the projection images. Because the actual subset or selection of the respective image elements used in different iterative acts may vary, and may change, for example, from iterative act to iterative act, it is possible, however, over a plurality of iterations, despite the use in each case of not all the image elements or image element values, for all or at least a majority of all the image elements or image element values to be considered. Therefore, however, an adequate image quality of the motion-compensated image may ultimately be achieved with a reduced calculation effort.

In a particularly advantageous development, from iterative act to iterative act, the respective subset to be considered, that is, the aforementioned number or selection of the image elements or image element values, is determined at random. This advantageously allows a particularly simple and efficient and also particularly quick to carry out implementation of the method because no specification or determination of the image elements or image element values to be used that is based on a complex criterion is necessary. Because, in the course of the generation of a single motion-compensated image, a plurality of hundreds or thousands of iterative acts may be run through, the probability of artifacts being generated by the random selection or of a corresponding bias may be negligibly low.

In a further advantageous embodiment, a segmentation of the projection images and/or of the images generated therefrom, that is, for example, of the differential images, the iterative images, the provisional motion-compensated images and/or of the final image is carried out. By the segmentation, static, that is, still or fixed-position, and/or non-static, that is, moving regions, elements or structures, are then defined or determined. As a function thereof, the determination of the motion field and/or the use of the motion field when generating the motion-compensated image is then locally or spatially restricted. It has transpired that a size or extent of the calculated motion field may be greater than the size of an organ that is moving. In a region surrounding the organ that is moving, static elements or structures, that is, elements or structures that are not influenced by the motion of the target object, such as for example bones, for instance the spine or suchlike, may be arranged. Image artifacts may then be generated if the motion correction or motion compensation were to be applied not only to the moving elements or structures but also to the static elements or structures. Through the restriction that is provided in the present case of the motion compensation or of the motion field to the non-static regions or parts of a respective data set, that is, for example of the projection images or of a corresponding representation of the target object, these artifacts or image distortions may be effectively avoided. Different regions, elements, or structures may be segmented automatically or manually and determined or defined as static or non-static, for example, using intensity values and corresponding set threshold values, using which, for example, bone tissue or soft tissue may be differentiated. It is therefore possible, for example, for a predetermined allocation table to be used. Other image processing methods, machine learning methods and/or suchlike may likewise be used. Ultimately, an image quality of the final motion-compensated image may be improved by excluding static regions, parts, or structures in the determination or application of the motion field.

In an advantageous development, therefore, at least one static, that is, not defined as non-static, region is excluded for the determination of the motion field and/or for a use of the motion field to generate the motion-compensated image. This is particularly advantageous as an addition to or alternative to the restriction or limiting of the motion compensation to a non-static region, because static regions, such as bones, for example, may be particularly precisely segmented, unlike borders between soft organs for example. In this way, it is possible in a particularly effective manner to avoid the motion compensation not being carried out for regions that are indeed moving, but the bounds whereof cannot be clearly detected, however.

In an advantageous development, the definition or determination of the static or non-static regions is carried out in each case on the basis of the current reference image and updated after each replacement or update of the reference image, e.g., automatically. Because the new reference images generated regularly during the iteration process may have in each case an improved image quality compared with older reference images, it is possible in this way to provide optimum accuracy of segmentation in each case. Thus, for example, a static region that initially appears to be broadened or blurred due to the motion in the first iterative acts may remain disregarded in the motion compensation. In later iterations, it is then possible, by a new segmentation with increased accuracy, for peripheral regions of the region initially classed as static that were not considered initially, for example, to be identified as not belonging to the respective static structure and then be considered subsequently for the motion compensation. As a result, the motion compensation may ultimately be carried out with improved accuracy and consequently an image quality of the final motion-compensated image may be improved. In particular, a highly precise segmentation in the form of a separate, additional input data item is not required. At the same time, as a result of the fact that the segmentation is not carried out afresh in each iterative act, computation time is saved and the efficiency of the method is consequently improved.

In an advantageous development, the local or spatial restriction ensues according to a predetermined weighting function, by which, starting from a respective non-static region, regions that are more distant are considered to a lesser extent in the determination and/or application of the motion field. In other words, it is possible therefore for a so-called Fade-Out of the motion compensation or of the motion field to be provided, starting from a moving structure. As a parameter for the distance, a Euclidean Distance Transform may be used or applied. Likewise, different weighting functions may be used, for example a cosine weighting or a rectangular weighting or suchlike. Optimization options are available according to the requirements or situation.

Through the use of the predetermined weighting function, it is possible for only one single, (e.g., centrally located), moving element, that is, a non-static region or sub-region, to be defined or identified and then used as the origin or starting point for the weighting function, that is, for the determination or application of the motion field. As a result, where necessary, a further detailed segmentation or definition of static or non-static regions in peripheral regions of an image or mapping region may be avoided or carried out with less precision, for example. This also saves computation work and consequently the method may advantageously be performed more quickly and/or more efficiently. The weighting function may be specified, for example, depending on the application, that is, as a function of the type of each target object mapped, for instance. In this way, invariable external circumstances relating to the respective mapping or examination of the target object, for example, a basic geometry or arrangement of an imaging device used with respect to the target object, may be usefully considered. If, for example, the imaging device is aligned with a central point in a patient's body, then it is already known beforehand that no bones will be located in a center or central region of the respective image, but that in a peripheral region of the scanning region, the spine, for example, which remains motionless even during respiration, may be located. Relevant data may then be used in the form of the predetermined weighting function in order to improve the efficiency or running speed of the method without impairing the quality of the final motion-compensated image.

A further aspect is a data processing facility for generating a motion-compensated image of the target object from the projection images. The processing facility is designed and equipped to perform, in particular in a partly or fully automatic manner, at least one embodiment of the method.

A further aspect is an imaging device, which includes an acquisition facility for acquiring a plurality of projection images of a target object and a data processing facility for generating a motion-compensated image of the target object from the projection images. The data processing facility may therefore be embodied and equipped in particular for automatically carrying out at least one embodiment or variant of the method. The imaging device may therefore be in particular the imaging device mentioned in conjunction with the method. The acquisition facility may be part of the data processing facility, that is, it may be or include a data interface and/or a corresponding program module, and the acquisition facility may likewise be a mapping facility, for example an X-ray device, that is, an X-ray source and a corresponding X-ray detector, or suchlike.

A further aspect is a computer program or computer program product that includes commands or control instructions which, when the computer programs is run by a computer, in particular by the data processing facility or the imaging device, cause the relevant computer to carry out at least one embodiment or variant of the method, in particular automatically or semi-automatically. The computer program therefore encodes or represents in other words the process acts of the method.

A further aspect is a computer-readable storage medium, on which a computer program is stored.

In particular, the imaging device may include at least one computer-readable storage medium, for example as part of its data processing facility. The imaging device, in particular the data processing facility thereof, may then further include a processing device, for example a microprocessor, microchip or microcontroller, for carrying out the computer program or program code stored on the computer-readable storage medium.

A further aspect is a data carrier signal, which transmits a computer program.

Further processes, sequences or measures described here, for example, in conjunction with some or a plurality of aspects, may be or form—potentially optional—further components or process acts of the method. Likewise, the remaining aspects, in conjunction with the method, may contain properties and/or components that have been mentioned.

The characteristics and developments of the method, of the imaging device, of the computer program and of the computer-readable storage medium that are set out in the aforementioned and hereinafter are in each case mutually transferable between these aspects. The disclosure therefore also includes such developments of the aforementioned aspects of the disclosure that include embodiments that are not described explicitly here in the relevant combination or not described separately for each of the aspects in order to avoid unnecessary redundancy.

BRIEF DESCRIPTION OF THE DRAWINGS

Further features, details, and advantages of the present disclosure will emerge from the description that follows of exemplary embodiments and by the drawings, in which.

DETAILED DESCRIPTION

In the exemplary embodiments, the components of the embodiments that are described each represent individual features of the disclosure that are to be considered independently of one another, and each of which develop the disclosure independent of one another and hence are also each to be regarded as a component of the disclosure either individually or in a different combination than that shown. Furthermore, the embodiments described may also be supplemented with further features of the disclosure that have already been described.

Figure 1:
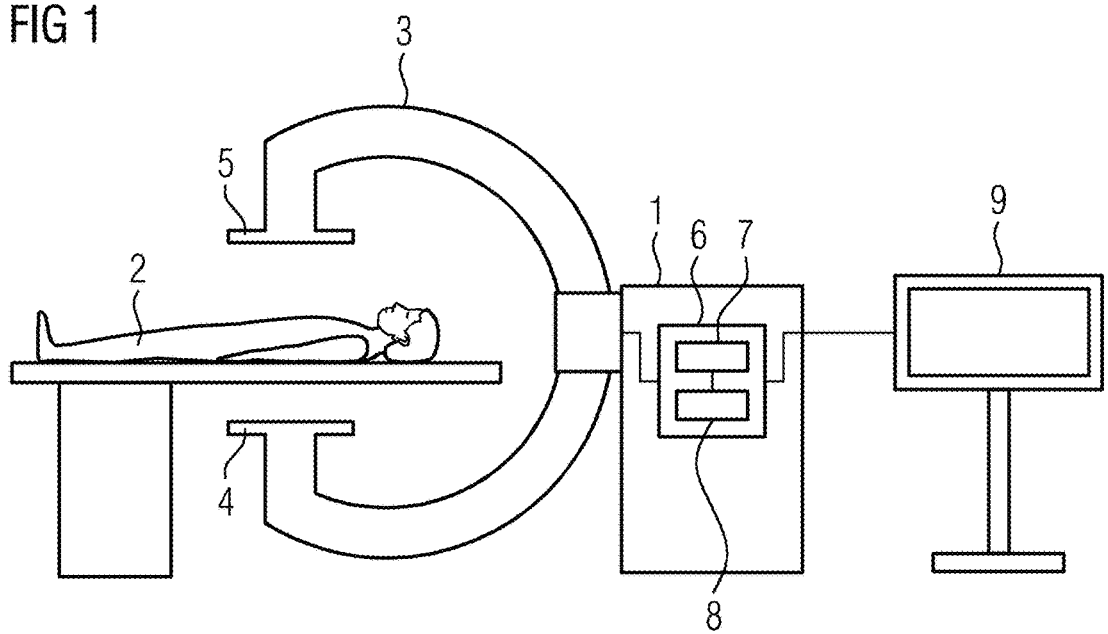
FIG. 1 depicts an example of a schematic view of an imaging device for generating a motion-compensated image of a patient.

FIG. 1 depicts a schematic view of an imaging device 1 for imaging a patient 2, that is, for generating an image of the patient 2 or of a sub-region that acts as a target object, for example of an organ, in the patient 2. For this purpose, the imaging device 1 includes in the present case a C-arm 3 with an X-ray source 4 affixed thereto and facing the X-ray source a detector 5, likewise affixed onto the C-arm 3. The imaging device 1 further includes a data processing facility 6 for the acquisition and processing of measured data and image data acquired using the detector 5, in particular from a plurality of projection images of the patient 2. For this purpose, the data processing facility 6 includes a processing device 7, indicated here diagrammatically, and a computer-readable storage medium 8 connected thereto. Stored on the storage medium 8 is a computer program, that is, an executable program code, which may be run using the processor device 7. The computer program may be, for example, an operating program for the imaging device 1 and include commands or control instructions for the imaging device 1 or for the data processing facility 6.

When the computer program is run using the processor device 7, the imaging device 1 therefore carries out, in particular automatically, a method for generating the image of the patient 2, in particular applying a motion correction or motion compensation.

Further shown here in schematic form is a display device 9, which is connected to the data processing facility 6 and by which the image of the patient 2 that has been generated may be shown or displayed. The display device 9 may be part of the imaging device 1 or connected thereto.

Figure 2:
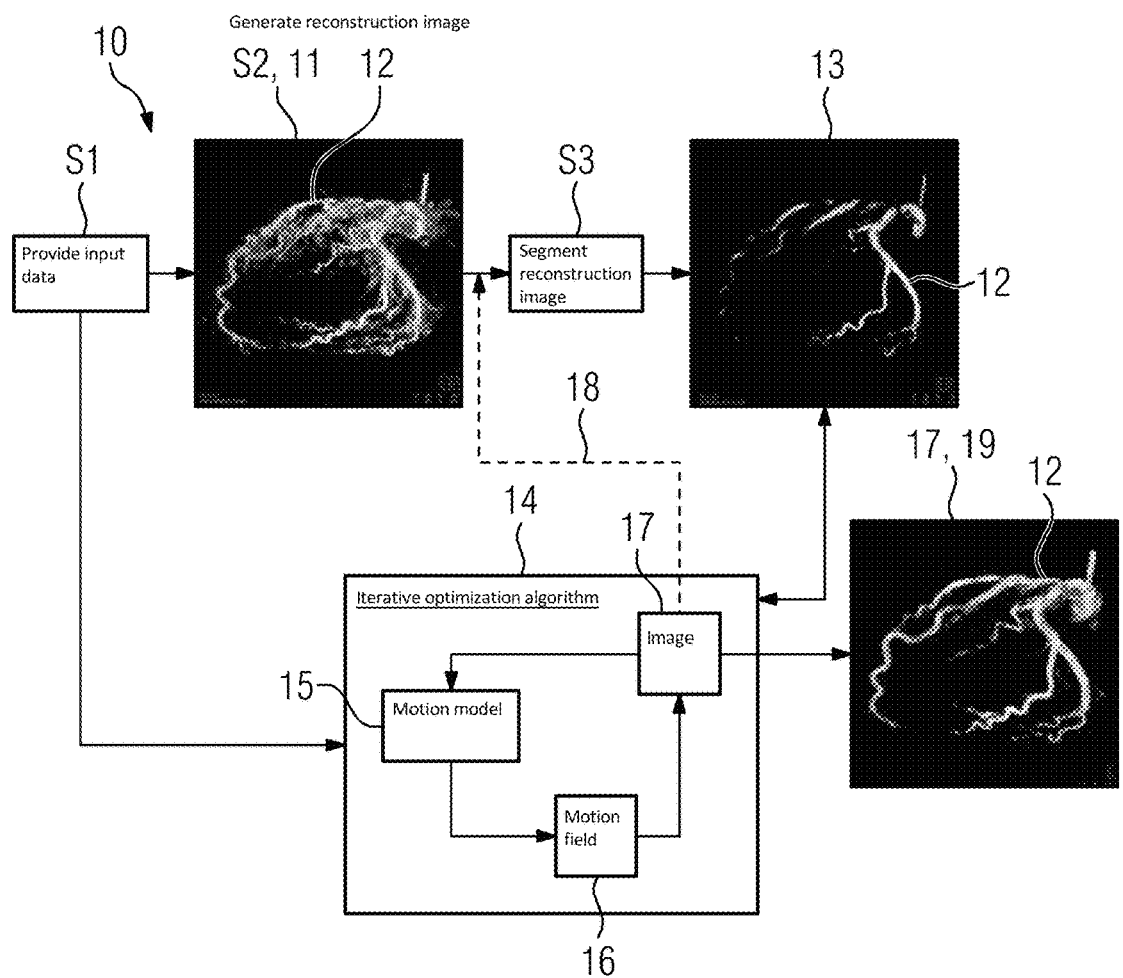
FIG. 2 depicts an example of a diagram illustrating a method for generating a motion-compensated image of a patient, for example, using the imaging device from FIG. 1.

FIG. 2 depicts a process diagram 10 to illustrate or show the aforementioned method for generating the image, in particular the motion-compensated image of the patient 2 using the imaging device 1.

In a process act S1, input data is provided, for example to the data processing facility 6. This input data includes here rotation data, for instance, that is, projection images of the patient 2 acquired from different angulations using the detector 5, or relevant raw data. The input data may include further data, for example, operational settings or operating parameters of the imaging device 1, data or signals and/or user inputs provided by an external device or an external signal source or signals and/or user inputs from a respective user or operator, for example from medical or medical technology staff. The latter may be or include, for example, specifications or settings inputted via a user interface of the imaging device 1.

In a process act S2, an initial reconstructed image 11 is first generated by the data processing facility 6, using a conventional reconstruction algorithm, for example. Here, the initial reconstructed image 11 is, for example, a 3D- or volume image of a vascular tree 12 in the patient 2. In the present case, the initial reconstructed image 11 may be generated from all the projection images recorded, in particular without using a synchronization or gating signal, which characterizes a motion of the patient 2 during the recording of the projection images. Therefore, the initial reconstructed image may include corresponding motion artifacts.

In a process act S3, the initial reconstructed image 11 is segmented, in particular automatically, for example by using an intensity-based thresholding method. The result is a reference image 13, which may be thinly or sparsely populated—even compared with the initial reconstructed image 11. For example, just one out of 1000 voxels in the reference image 13 may include image element values that differ from 0, because in the segmentation or in the intensity-based or image element values-based thresholding method, image element values that are below the respective threshold value or that have not been acquired by the threshold may be replaced by 0 in process act S3. The reference image 13 shows at least one part of the vascular tree 12 but may be restricted to the maximum-intensity regions thereof.

The aim here is to generate a motion-compensated image, that is, an image of the vascular tree 12 or of the patient 2 that is as free as possible from motion artifacts. For this purpose, the reference image 13 is used here for the iterative estimation of the motion of the patient 2 during the recording of the projection images that form the basis of the reference image 13.

Likewise, the motion may be determined at the time when other projection images are recorded, for example when ECG gating is used. Here, during a rotation of the C-arm 3, projection images may be recorded in all cardiac phases. The reference image then uses only a selection of the projection images recorded for a specific cardiac phase. The method described here may then also determine, in all the cardiac phases, the motion in the projection images that have not been used.

An iterative optimization algorithm 14, indicated in diagram form, is used here. For this purpose, a motion model 15 of the respective target object, in this case therefore of the patient 2, of an organ in the patient 2 that includes the vascular tree 12 or of the vascular tree 12 itself, may be specified, for example. This motion model 15 may include or model a 3D volume with motion vectors $s_i$ for each projected image pi.

A comparatively small data set may include, for example, $3 \cdot N \cdot M_x \cdot M_y \cdot M_z = 3 \cdot 133 \cdot 10^3 = 399000$ parameters, whereas a comparatively large data set may include accordingly, for example, $3 \cdot 304 \cdot 10^3 = 912000$ parameters. It may therefore be the case here of a significant optimization problem, which may advantageously be managed using the Adam algorithm, for example.

Apart from the reference image 13, at least some of the input data may be supplied to the optimization algorithm 14, for example, details of the volume mapped or about the projection, such as for instance, a size, a resolution or a point of origin or suchlike. First a predetermined, robust cost function L is applied or the integral ∫L is evaluated in order to find a non-periodic, smooth, elastic vector field s, also referred to as the motion field 16.

The motion field, that is, the vectors thereof s, may initially be determined on a predetermined grid, for example with a width, that is, a point spacing, of 25 mm for instance. Values for regions located between the points in the grid may then be determined, for example using a linear interpolation in the location domain. As a result, computation work may advantageously be saved. However, because in practice an abrupt change in the real motion field is not to be expected, advantageously accuracy is only negligibly adversely affected by the interpolation.

A respective iterative image 17 is then generated by dynamic filtered back projection from the projection images pi using the motion field 16. The similarity between the iterative image 17 and the reference image 13 is subsequently evaluated and then the iterative optimization algorithm 14 is optionally run again, that is, the next iterative act is carried out for as long as a predetermined termination condition has not been met. As a termination condition, a predetermined number of iterative acts or a similarity criterion or a quality criterion may be specified for the iterative image 17, for example.

For example, the following equation (1) may apply:

$$L(s)=f(x,s)^3 \cdot f_r(x) = f_r(x)(\Sigma_{i=1..N} f_i(x,s_i))^3 \qquad (1)$$

where x is the spatial variable, the index i counts the projection images, the term f (x, s) specifies a motion-compensated back projection from the projection images, that is, specifies a motion-compensated reconstructed image, and the term $f_r(x)$ describes the reference image 13.

In particular, the third power used here in equation (1) is to be understood purely by way of example, and other values are also possible for the exponent, for example 1 or greater than 1. A structure of $f_r(x)$ may be extremely sparse. Contributions of image element values and of derivatives or derived values may be 0 for example, for 99.75% of the voxels in the reference image 13. Advantageously, by implementing a sparse GPU back projection, a considerable amount of computation time and storage requirements may be avoided. The most complex operation may be the formation of a derivative of the back projection $df_i(x,s_i)/d(s_i)$. This may be implemented for efficient calculation, for example using a six-point finite-differences method, which results in 18 back projections per voxel.

A further predetermined parameter is an update interval K, which specifies after how many iterative acts k the reference image 13 is updated. To update the reference image 13, the most current iterative image 17 in each case is described as the provisional motion-compensated image, as for process act S3, and segmented as indicated here by a program path 18 in order to obtain a new or updated reference image 13, the respective existing reference image 13 being replaced.

The imaging device may include a user interface or a graphic user interface via which parameters or settings for the iterative optimization algorithm 14 may be changed interactively and a convergence process of the motion compensation may be observed.

A pseudocode is set out below—for the sake of completeness for a scenario where a synchronization signal or gating signal is used, the relevant acts being optional, however:

Parameters:
Reference image gating function series $w_{ref}^k(i)$,
Update interval k of reference image
Algorithm inner loop for iteration k:
If k==0 or mod(k,K)==0: #update reference image
  → Compute dense gated motion compensated reconstruction $f^k(s^{k-1})$ using $w_{ref}^k(i)$
  → Compute reference image $r^k$ from $f^k$
Else: $r^k=r^{k-1}$
Compute sparse motion compensated reconstruction: $f^k(s^{k-1})$
Compute sparse gated loss derivative: $\Delta L_i = 3 \cdot f^k \cdot f^k \cdot r^k \cdot (df_i^k/ds_i^{k-1})$
Regularize the derivative (e.g. via spatial gauss-smoothing)
Compute new motion parameters $s_i^k = \text{Adam}(s_i^{k-1}, \Delta L_i)$ If the termination condition is met, then, for example, the last iterative image generated may be issued as a definitive or final motion-compensated image 19. Likewise, one or a plurality of processing acts may be applied to the respective iterative image 17 to generate the motion-compensated image 19. Such further processing acts may be for instance the application of a predetermined filter, an—optionally partial—coloring, an object recognition and marking, for example using a respective bounding box, and/or suchlike. Likewise, a segmentation may be applied to the respective iterative image 17 to generate a motion-compensated image 19 or to the motion-compensated image 19, as described in conjunction with process act S3.

An alternative to the method described here is an estimation of the deformation- or motion field through a 2D-3D-registration of the reference image 13 with the projection images. Such a 2D-3D registration is, however, sensitive to all the objects scanned. Moreover, the 2D-3D-registration is massively adversely affected by severe streak artifacts that thin, high-contrast moving blood vessels, such as in this case the vascular tree 12, may generate. The cost function L described for the estimation of motion on the other hand is robust with regard to severe image artifacts and is only negligibly influenced thereby.

Figure 3:
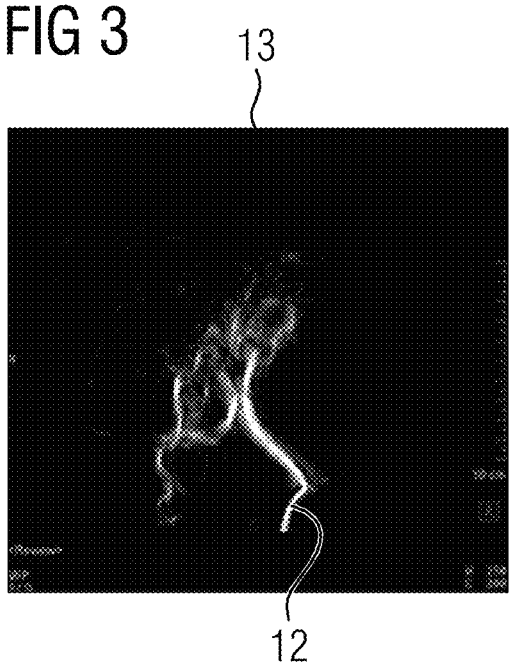
FIG. 3 depicts, in schematic form, an example of an initial reference image of a vascular tree.

FIG. 3 depicts in diagram form an initial reference image 13 of the or of a vascular tree 12, such as may be present in the iterative act 0. The vascular tree 12 shown here is still not sharp or blurred and incomplete.

Figure 4:
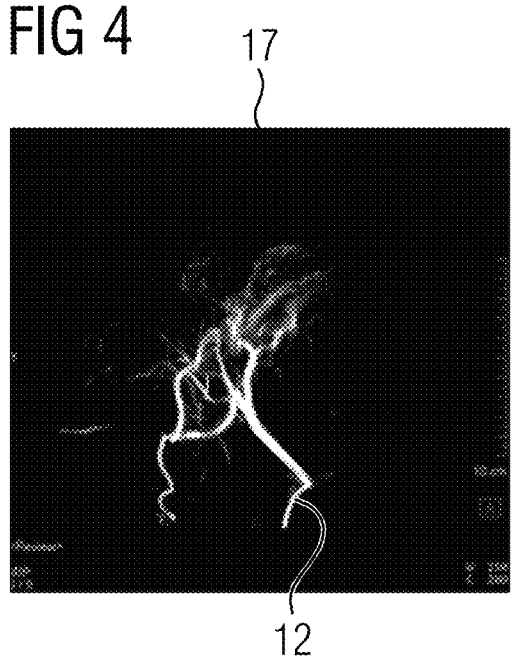
FIG. 4 depicts an example of a provisional motion-compensated image of the vascular tree from FIG. 3 after 600 iterations.

FIG. 4 depicts in diagram form an iterative image 17, such as may emerge or be displayed from the initial reference image 13 after 600 iterations, for example. Here the vascular tree 12 is sharper, that is, more easily located and more complete than in the initial reference image 13.

Figure 5:
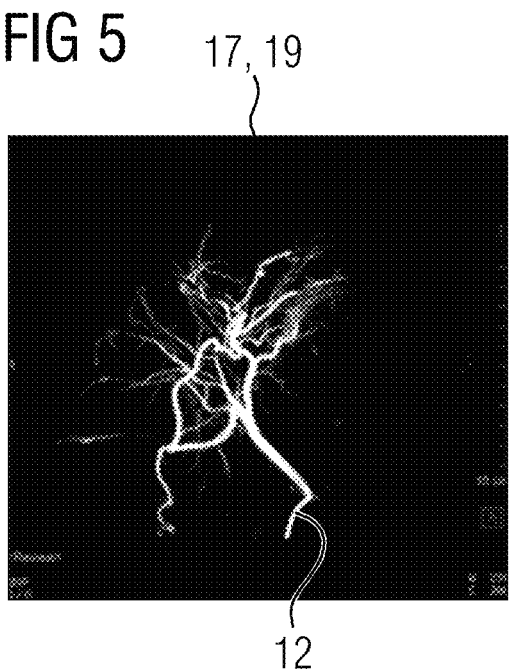
FIG. 5 depicts an example of a motion-compensated image of the vascular tree from FIG. 3 after 1800 iterations.

FIG. 5 depicts in diagram form a further iterative image 17 of the vascular tree 12, such as may emerge or be displayed, for example, after 1800 iterations. Here once again, the vascular tree 12 is displayed more sharply and completely. The iterative image 17 shown in FIG. 5 may be used as the final motion-compensated image 19 of the vascular tree 12 or processed, for example by segmentation, filtering or other further post-processing, to create the final motion-compensated image 19.

In total, the examples described show how a 3D image reconstruction of moving structures, in particular of blood vessels, may be achieved on the C-arm system using a motion compensation that does not require a synchronization or gating signal.

Although the disclosure has been illustrated and described in detail using the exemplary embodiments, the disclosure is not limited by the disclosed examples, and a person skilled in the art may derive other variations therefrom without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for generating a motion-compensated image of a target object, the method comprising:
  acquiring a plurality of projection images of the target object, the plurality of projection images being recorded during a motion of at least one part of the target object, wherein the motion has a main point;
  generating a reference image of the target object from the plurality of projection images without using a synchronization signal that characterizes the motion of the target object; and
  iteratively determining, from the plurality of projection images, a motion field that characterizes the motion of the target object, wherein the motion field comprises motion vectors for individual projection images of the plurality of projection images, with respect to a current reference image,
  wherein, in each case, after a predetermined number of iterative acts with motion compensation based on the motion field that is then current in each case, a provisional motion-compensated image of the target object is generated,
  wherein the respective existing reference image is replaced by the provisional motion-compensated image as a new current reference image,
  wherein the iterative determination of the motion field is continued using the new current reference image,
  wherein a segmentation of the plurality of projection images and/or of the images generated therefrom is carried out, that by the segmentation, static and/or non-static regions are defined and as a function thereof, the determination of the motion field and/or the use of the motion field is spatially restricted when the motion-compensated image is being generated, and
  wherein, when a predetermined termination condition for the iteration is reached, the motion-compensated image is generated from the plurality of projection images and from the last iteration of the motion field, or the last provisional motion-compensated image generated during the iteration as the motion-compensated image of the target object is issued.

2. The method of claim 1, wherein a sparsification is used for the generating of the reference image, as a result whereof a sparsely populated image is generated as the reference image, which sparely populated image contains, out of all image element values that are available for the respective reference image only highest image element values that have been selected using a predetermined threshold value.

3. The method of claim 1, wherein the iterative determination of the motion field is implemented as an optimization problem having a predetermined cost function, which as a metric for the optimization problem characterizes a correlation between the respective reference image and an image of the target object generated with the respective current motion field in a motion-compensated manner.

4. The method of claim 3, wherein a term in the cost function that describes a respective motion-compensated iterative image of the target object has an exponent that is greater than 1.

5. The method of claim 3, wherein, to solve the optimization problem, an Adam algorithm is used for stochastic optimization.

6. The method of claim 1, wherein, in each iterative act in the determination of the motion field, only a subset less than all image elements available for this purpose is used, and
wherein the subset is a maximum of 20% of all of the image elements.

7. The method of claim 6, wherein, from iterative act to iterative act in the determination of the motion field, the subset to be considered in each case is determined at random.

8. The method of claim 1, wherein at least one static region for the determining of the motion field and/or for a use of the motion field is excluded when generating the motion-compensated image,
wherein the at least one static region is identified as a region that has not been defined as non-static.

9. The method of claim 1, wherein the definition of the static or non-static regions is carried out in each case based on the current reference image and updated after every replacement of the reference image.

10. The method of claim 1, wherein the spatial restriction is carried out according to a predetermined weighting function, by which, starting from a respective non-static region, regions that are more distant are considered to a lesser extent in the determination and/or application of the motion field.

11. A data processing facility for generating a motion-compensated image of a target object from a plurality of projection images of the target object, wherein the data processing facility is configured to automatically:
acquire the plurality of projection images of the target object, the plurality of projection images being recorded during a motion of at least one part of the target object, wherein the motion has a main point;
generate a reference image of the target object from the plurality of projection images without using a synchronization signal that characterizes the motion of the target object; and
iteratively determine, from the plurality of projection images, a motion field that characterizes the motion of the target object, wherein the motion field comprises motion vectors for individual projection images of the plurality of projection images, with respect to the current reference image,
wherein, in each case, after a predetermined number of iterative acts with motion compensation based on the motion field that is then current in each case, a provisional motion-compensated image of the target object is generated,
wherein the respective existing reference image is replaced by the provisional motion-compensated image as a new current reference image,
wherein the iterative determination of the motion field is continued using the new current reference image,
wherein a segmentation of the plurality of projection images and/or of the images generated therefrom is carried out, that by the segmentation, static and/or non-static regions are defined and as a function thereof, the determination of the motion field and/or the use of the motion field is spatially restricted when the motion-compensated image is being generated, and
wherein, when a predetermined termination condition for the iteration is reached, the motion-compensated image is generated from the plurality of projection images and from the last iteration of the motion field, or the last provisional motion-compensated image generated during the iteration as the motion-compensated image of the target object is issued.

12. An imaging device comprising:
an acquisition facility configured to record a plurality of projection images of a target object during a motion of at least one part of the target object, the motion having a main point; and
a data processing facility configured to:
receive the plurality of projection images of the target object;
generate a reference image of the target object from the plurality of projection images without using a synchronization signal that characterizes the motion of the target object; and
iteratively determine, from the plurality of projection images, a motion field that characterizes the motion of the target object, wherein the motion field comprises motion vectors for individual projection images of the plurality of projection images, with respect to a current reference image,
wherein, in each case, after a predetermined number of iterative acts with motion compensation based on the motion field that is then current in each case, a provisional motion-compensated image of the target object is generated,
wherein the respective existing reference image is replaced by the provisional motion-compensated image as a new current reference image,
wherein the iterative determination of the motion field is continued using the new current reference image,
wherein a segmentation of the plurality of projection images and/or of the images generated therefrom is carried out, that by the segmentation, static and/or non-static regions are defined and as a function thereof, the determination of the motion field and/or the use of the motion field is spatially restricted when the motion-compensated image is being generated, and
wherein, when a predetermined termination condition for the iteration is reached, a motion-compensated image is generated from the plurality of projection images and from the last iteration of the motion field, or the last provisional motion-compensated image generated during the iteration as the motion-compensated image of the target object is issued.

13. A non-transitory computer-readable storage medium on which a computer program is stored, wherein the computer program, when executed by a computer, causes a data processing device to:

acquire a plurality of projection images of a target object, the plurality of projection images being recorded during a motion of at least one part of the target object, wherein the motion has a main point;

generate a reference image of the target object from the plurality of projection images without using a synchronization signal that characterizes the motion of the target object; and iteratively determine, from the plurality of projection images, a motion field that characterizes the motion of the target object, wherein the motion field comprises motion vectors for individual projection images of the plurality of projection images, with respect to a current reference image, wherein, in each case, after a predetermined number of iterative acts with motion compensation based on the motion field that is then current in each case, a provisional motion-compensated image of the target object is generated, wherein the respective existing reference image is replaced by the provisional motion-compensated image as a new current reference image, wherein the iterative determination of the motion field is continued using the new current reference image, wherein a segmentation of the plurality of projection images and/or of the images generated therefrom is carried out, that by the segmentation, static and/or non-static regions are defined and as a function thereof, the determination of the motion field and/or the use of the motion field is spatially restricted when the motion-compensated image is being generated, and wherein, when a predetermined termination condition for the iteration is reached, a motion-compensated image is generated from the plurality of projection images and from the last iteration of the motion field, or the last provisional motion-compensated image generated during the iteration as the motion-compensated image of the target object is issued.

\* \* \* \* \*